United States Patent
Wilson et al.

(10) Patent No.: US 12,552,096 B2
(45) Date of Patent: Feb. 17, 2026

(54) THREE-DIMENSIONAL PRINTING WITH COALESCING AGENT

(71) Applicant: PERIDOT PRINT LLC, Palo Alto, CA (US)

(72) Inventors: Karsten N. Wilson, Corvallis, OR (US); Emre Hiro Discekici, San Diego, CA (US); Vladek Kasperchik, Corvallis, OR (US); Timothy L. Weber, Corvallis, OR (US); Mark Kowalski, Corvallis, OR (US); Sterling Chaffins, Corvallis, OR (US); Devin Alexander Mourey, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 188 days.

(21) Appl. No.: 18/290,081

(22) PCT Filed: Jun. 3, 2021

(86) PCT No.: PCT/US2021/035795
§ 371 (c)(1),
(2) Date: Nov. 9, 2023

(87) PCT Pub. No.: WO2022/256015
PCT Pub. Date: Dec. 8, 2022

(65) Prior Publication Data
US 2024/0253303 A1 Aug. 1, 2024

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 30/00* (2014.12); *B33Y 70/00* (2014.12)

(58) Field of Classification Search
CPC ....... B29C 64/165; B33Y 10/00; B33Y 30/00; B33Y 70/00; B33Y 80/00
See application file for complete search history.

(56) References Cited

U.S. PATENT DOCUMENTS

| | | |
|---|---|---|
| 12,377,604 B2 * | 8/2025 | Ionescu .................. B33Y 70/10 |
| 2019/0111479 A1 | 4/2019 | Kasperchik et al. |

(Continued)

FOREIGN PATENT DOCUMENTS

| | | |
|---|---|---|
| WO | 2020/246991 A1 | 12/2020 |
| WO | 2020/251520 A1 | 12/2020 |
| WO | 2021/080565 A1 | 4/2021 |

*Primary Examiner* — Nahida Sultana
(74) *Attorney, Agent, or Firm* — Dierker & Kavanaugh, P.C.

(57) ABSTRACT

A method of three-dimensional printing can include iteratively applying a polymer build material as individual layers to a powder bed, where the polymer build material includes from about 80 wt % to 100 wt % polymeric particles, and based on a three-dimensional object model, selectively applying a coalescing agent onto individual layers of the polymer build material. The coalescing agent can include an aqueous liquid vehicle and a coalescing solvent that depresses a melting point of the polymeric particles. The method can include exposing the powder bed to heat to selectively coalesce portions of individual layers of the polymer build material in contact with the coalescing solvent. The heat may not be sufficient to coalesce the polymer build material that is not in contact with the coalescing solvent and may be sufficient to fuse the polymeric particles in contact with the coalescing solvent together to form a three-dimensional object.

16 Claims, 2 Drawing Sheets

(51) Int. Cl.
*B33Y 30/00* (2015.01)
*B33Y 70/00* (2020.01)

(56) References Cited

U.S. PATENT DOCUMENTS

2020/0101531 A1\* 4/2020 Prakash .................. B22F 7/08
2023/0264414 A1\* 8/2023 Erickson ............... B29C 64/307
264/494

\* cited by examiner

THREE-DIMENSIONAL PRINTING WITH COALESCING AGENT

BACKGROUND

Three-dimensional (3D) printing is a process used to make three-dimensional solid parts from a digital model. Three-dimensional printing is often used in rapid product prototyping, mold generation, mold master generation, and/or short run manufacturing. Some three-dimensional printing techniques are considered additive manufacturing processes because, for instance, they involve the application of successive layers of build material. This is unlike other machining processes, which often rely upon the removal of material to create the final part or object.

DETAILED DESCRIPTION

Figure 1:
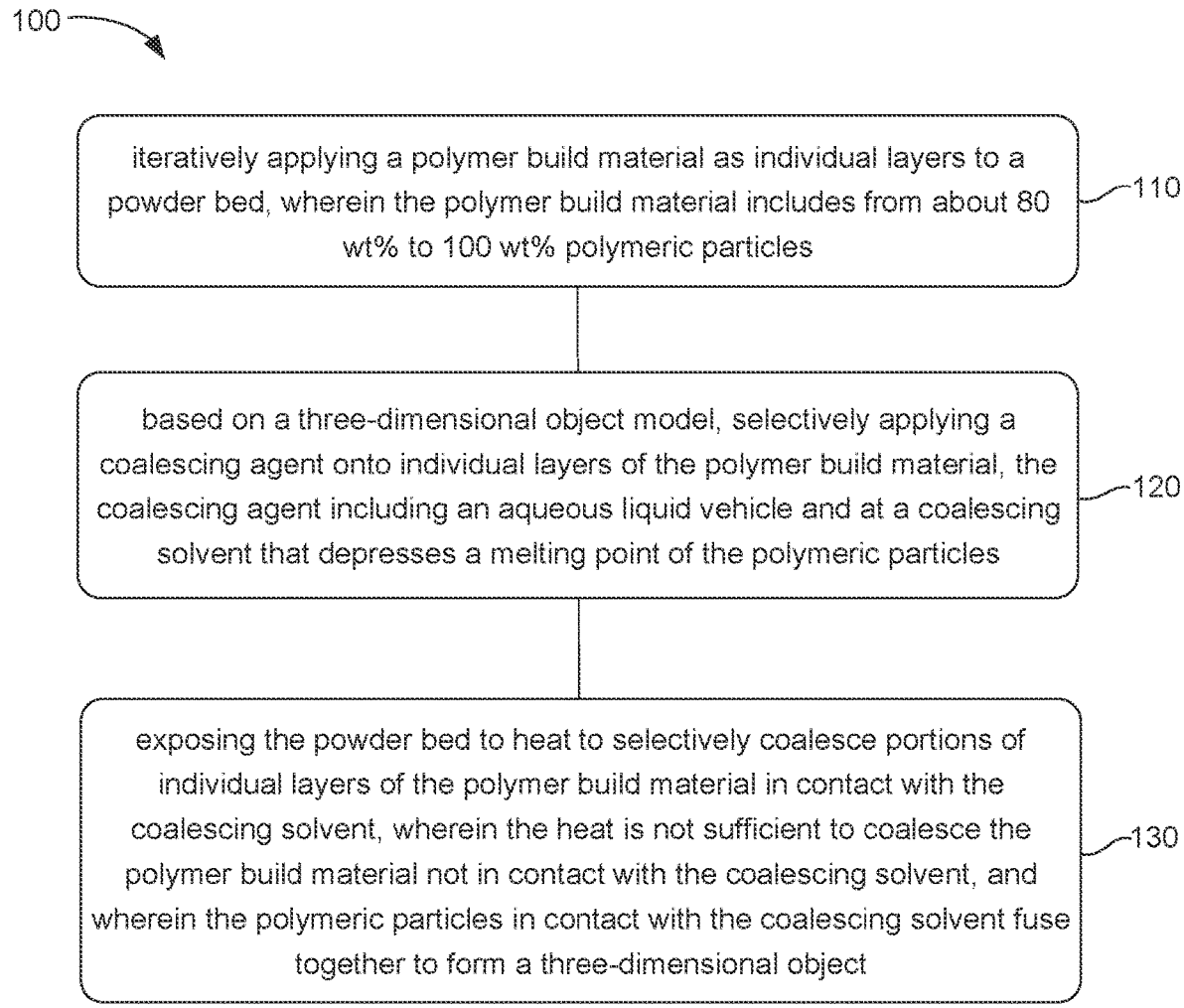
FIG. 1 is a flow diagram illustrating example methods of three-dimensional printing in accordance with the present disclosure.

Three-dimensional printing using polymer particles is additive process involving the application of successive layers of a polymer build material. More specifically, a fusing agent including a radiation absorber is selectively applied to a layer of a polymer build material positioned on a support bed, e.g., a build platform supporting polymer build material, to pattern a selected region of a layer of the polymer build material. The layers of the polymer build material can be iteratively exposed to electromagnetic radiation and due to the presence of the electromagnetic radiation absorber on just the printed portions, the electromagnetic energy applied generates additional heat due to the presence of the radiation absorber in the patterned or selected regions, causing the polymer particles of the polymer build material to become heat fused together. Other portions of the polymer build material do not likewise reach temperatures suitable to melt or coalesce together, leaving the powder essentially intact, not becoming part of the three-dimensional printed object. Upon repeating this on a layer-by-layer basis, the three-dimensional printed object is formed within the powder bed of polymer build material. However, there are other ways to promote selective heat fusing of the polymer build material layers during the build, as described in the context of the present disclosure.

In accordance with this, methods of three-dimensional printing include iteratively applying a polymer build material as individual layers to a powder bed, where the polymer build material includes from about 80 wt % to 100 wt % polymeric particles, and based on a three-dimensional object model, selectively applying a coalescing agent onto individual layers of the polymer build material. The coalescing agent includes an aqueous liquid vehicle and a coalescing solvent that depresses a melting point of the polymeric particles. The methods include exposing the powder bed to heat to selectively coalesce portions of individual layers of the polymer build material in contact with the coalescing solvent. The heat in these examples is not sufficient to coalesce the polymer build material that is not in contact with the coalescing solvent and but is sufficient to fuse the polymeric particles in contact with the coalescing solvent together to form a three-dimensional object. In other examples, the coalescing solvent can depress a melting point of the polymeric particles by about 1° C. to about 20° C. which can result in a modified melting point from about 90° C. to about 200° C. In other examples, the coalescing agent can be applied to the polymer build material at a weight ratio of coalescing agent to polymer particles of about 1:3 to about 20:1. The radiant heat can have a temperature ranging from about 80° C. to about 160° C. and a heating time period can range from about 5 minutes to about 45 minutes. The three-dimensional object formed can be a porous filter having a porosity ranging from about 20% to about 90% by volume. In some examples, the polymer build material can include polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, or copolymers thereof, and the polymeric particles can have an average particle size from about 50 μm to about 1 mm. In other examples, the coalescing solvent can include 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, or a combination thereof.

Three-dimensional printing kits include a polymer build material including from about 80 wt % to 100 wt % polymeric particles, and a coalescing agent including an aqueous liquid vehicle and a coalescing solvent that can depress a melting point of the polymeric particles when contacted therewith. The three-dimensional printing kit in these examples need not include a fusing agent containing a radiation absorber. In some examples, the polymer build material can include polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, or copolymers thereof. The polymeric particles can have an average particle size from about 50 μm to about 1 mm. In other examples, the coalescing solvent can include 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, or a combination thereof. The coalescing solvent can be present in the coalescing agent at from about 30 wt % to about 70 wt %. In some examples, the coalescing solvent can depress a melting point of the polymeric particles by about 1° C. to about 20° C. which can result in a modified melting point from about 90° C. to about 200° C.

Systems for three-dimensional printing include a polymer build material, a coalescing agent, a printhead, and a radiant heat source. The polymer build material includes from about 80 wt % to 100 wt % polymeric particles. The coalescing agent includes an aqueous liquid vehicle and a coalescing solvent to depress a melting point of the polymeric particles. The printhead is fluidly coupled to or fluidly coupleable to the coalescing agent to selectively and iteratively eject the coalescing agent onto successively placed individual layers of the polymer build material, where the coalescing agent can depress a melting point of the polymeric particles. The radiant heat source is positioned or positionable to expose the individual layers of the polymer build material to radiation energy to selectively fuse the polymeric particles in contact with the coalescing solvent and to iteratively form a three-dimensional object. In some examples, the polymeric particles can include polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, or a copolymer thereof, wherein the coalescing solvent includes 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, or a combination thereof. In another example the three-dimensional object formed can be a porous object having a porosity ranging from about 20% to about 90% by volume.

When discussing the methods of three-dimensional printing, the three-dimensional printing kits, and/or the systems for three-dimensional printing herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the method of three-dimensional printing, the system for three-dimensional printing, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Methods of Three-Dimensional Printing

A flow diagram of an example method 100 of three-dimensional printing is shown in FIG. 1. The method can include iteratively applying 110 a polymer build material as individual layers to a powder bed, where the polymer build material can include from about 80 wt % to 100 wt % polymeric particles. Based on a three-dimensional object model, the method can include selectively applying 120 a coalescing agent onto individual layers of the polymer build material where the coalescing agent can include an aqueous liquid vehicle and a coalescing solvent that can depress a melting point of the polymeric particles, and exposing 130 the powder bed to heat to selectively coalesce portions of individual layers of the polymer build material in contact with the coalescing solvent. The heat need not be sufficient to coalesce the polymer build material which is not in contact with the coalescing solvent, while the heat may be sufficient to fuse the polymeric particles in contact with the coalescing solvent together to form a three-dimensional object.

In printing in a layer-by-layer manner, the polymer build material can be spread, the coalescing agent applied, the layer of the polymer build material can be exposed to heat, and then a build platform can be dropped a distance, for instance, of 5 μm to 1 mm, which can correspond to the thickness of a printed layer of the three-dimensional object, so that another layer of the polymer build material can be added again thereon to receive another application of the coalescing agent, and so forth. The method of three-dimensional printing presented herein can exclude the use of a fusing agent with a radiation absorber. The coalescing solvent can allow for fusing by depressing a melting point of the polymeric particles in contact with the coalescing solvent. The powder bed can then be heated at a temperature below a melting point of a polymer of the polymeric particles but above the depressed melting point of the polymeric particles in contact with the coalescing solvent. In some examples, the coalescing solvent can depress a melting point of the polymeric particles by about 1° C. to about 20° C. resulting in a modified melting point from about 90° C. to about 200° C. The coalescing solvent can depress a melting point of the polymeric particles from about 1° C. to about 10° C., from about 10° C. to about 20° C., or from about 5° C. to about 15° C. The depressing can result in a modified melting point ranging from about 90° C. to about 120° C., from about 150° C. to about 200° C., from about 150° C. to about 200° C., or from about 120° C. to about 180° C. The method of layering, selectively applying the coalescing agent, and exposing the powder bed to heat can be repeated until the individual polymer build material layers have been created and a three-dimensional object is formed.

The method can include preheating the polymer build material prior to dispensing or applying the individual layers of the polymer build material. In some examples, the method can include preheating the polymer build material prior to dispensing the polymer build material from a spreader into the powder bed. In other examples, the preheating can include heating the polymer build material in the powder bed prior to applying the coalescing agent thereto. The preheating temperature may be a temperature less than a depressed melting point of polymeric particles in contact with a coalescing solvent.

With respect to applying the coalescing agent to the polymer build material, the coalescing agent can be applied such that a specified amount of the coalescing solvent is in contact with the polymer build material. Accordingly, In some examples, a weight ratio of the coalescing solvent to polymer particles following the selective applying of the coalescing agent onto the polymer build material can range from about 1:3 to about 20:1. In other examples, a weight ratio of the coalescing solvent to polymer particles following the selective applying of the coalescing agent onto the polymer build material can range from about 1:5 to about 1:15, from about 1:10: to about 1:20, from about 1:3 to about 1:10, or from about 3:1 to about 10:1. The applying may be selective and may occur via a printhead as described below.

With respect to the heat that can be applied to the powder bed, the heat may be in the form of radiant heat which can be applied from above or below the powder bed. In some examples, the heat can be applied from above the powder bed. The heat can be applied at a temperature that heats the polymer build material to a temperature less than a melting temperature of the polymeric particles. An upper limit of the heat can be based on a melting temperature of a polymer of the polymeric particles. The heat can have a temperature ranging from about 80° C. to about 160° C. and a heating time period can range from about 5 minutes to about 45 minutes. In other examples, the heat can have a temperature ranging from about 80° C. to about 120° C., from about 120° C. to about 160° C., or from about 100° C. to about 140° C. The heating time period can range from about 15 minutes to about 30 minutes, from about 30 minutes to about 45 minutes, or from about 20 minutes to about 40 minutes.

The three-dimensional object formed can be a porous article. The porous article can have a porosity ranging from about 20% to about 90% by volume. In other examples, the porous article can have a porosity that can range from about 40% to about 85% by volume or from about 50% to about 75% by volume. A pore size of pores in the porous article can vary based on a particle size of the polymeric particles and an extent of the coalesced portions of the polymeric particles or the polymer build material.

The three-dimensional object formed can be a plastic filter in some examples. The filter may be a size exclusion filter, a depth filter, a water filter, or the like. The filter may be several layers thick. In some examples, the filter can be from about 2 to about 200 layers thick. In other examples, the filter can be from about 2 to about 80 layers thick, from about 50 to about 150 layers thick, from about 100 to about 200 layers thick, from about 2 layers to about 40 layers, or from about 5 layers to about 7 layers thick.

Three-Dimensional Printing Kits

Figure 2:
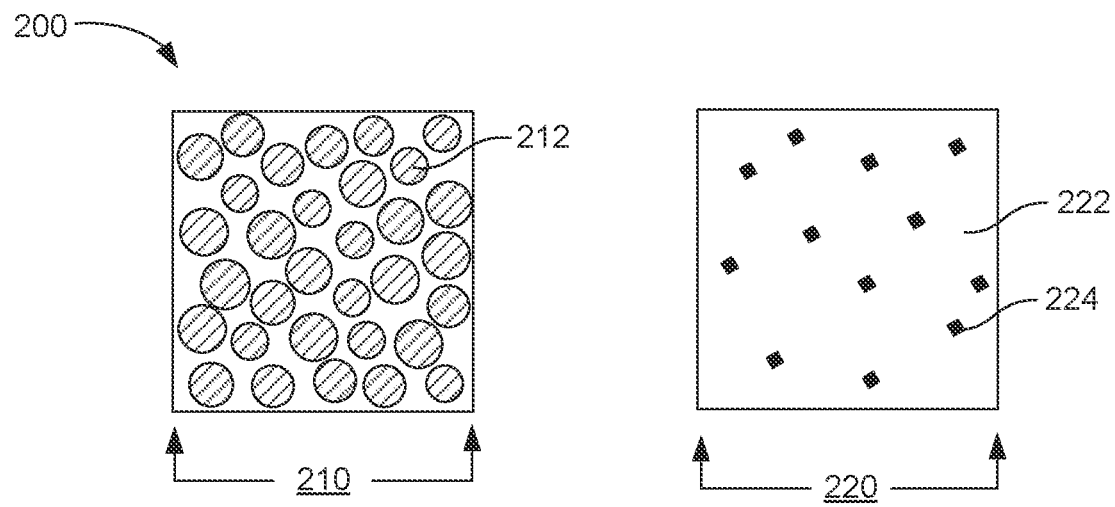
FIG. 2 is a schematic illustration example three-dimensional printing kits in accordance with the present disclosure.

A three-dimensional printing kit 200, as shown by way of example in FIG. 2, can include a polymer build material 210 and a coalescing agent 220. The polymer build material can include from about 80 wt % to 100 wt % polymeric particles 212. The coalescing agent can include an aqueous liquid vehicle 222 and a coalescing solvent 224. The coalescing solvent may be dispersed or dissolved in the aqueous liquid vehicle. The coalescing solvent can be a solvent that can depress a melting point of polymeric particles when contacted therewith. As used herein, "depress" or "depressing" when referring to a melting point of polymeric particles indicates that the coalescing solvent when in contact with polymeric particles can lower a melting temperature of a polymer of the polymeric particles to a temperature less than a melting temperature of the polymer of the polymeric particles that is not in contact with the coalescing solvent. In some examples, the lowering can be to a melting temperature that is at least 10° C. less, e.g., from about 10° C. to about 75° C. less than the melting temperature of the polymeric particles in their neat state. The coalescing agent can exclude a radiation absorber, and furthermore, the three-dimensional printing kit can also exclude a fusing agent with a radiation absorber, for example. Additional detail regarding the coalescing agents and the polymer build material is also provided hereinafter, except to mention that the polymer build material may be packaged or co-packaged with the coalescing agent in separate containers, and/or can be combined with the coalescing agent at the time of printing, e.g., loaded together in a three-dimensional printing system.

Systems for Three-Dimensional Printing

Figure 3:
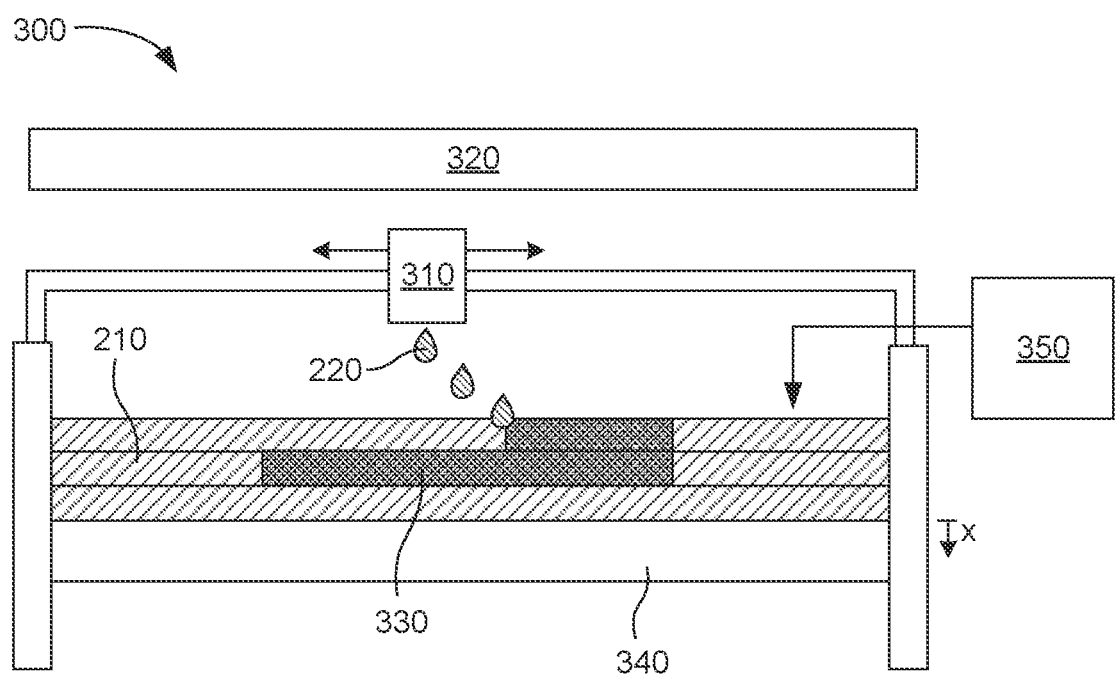
FIG. 3 is a schematic illustration of example three-dimensional printing systems in accordance with the present disclosure.

A system for three-dimensional printing 300, as shown in FIG. 3, can include a polymer build material 210, a coalescing agent 220, a printhead 310, and a radiant heat source 320. The polymer build material can include from about 80 wt % to 100 wt % polymeric particles. The coalescing agent can include an aqueous liquid vehicle and a coalescing solvent operable to depress a melting point of the polymeric particles. The printhead can be fluidly coupled to or fluidly coupleable to the coalescing agent to selectively and iteratively eject the coalescing agent onto successively placed individual layers of the polymer build material. The radiant heat source can be positioned or positionable to expose the individual layers of the polymer build material to radiation energy to selectively fuse the polymeric particles in contact with the coalescing solvent to iteratively form layers of a three-dimensional object 330. In some examples, the system can include coloring agent, additional printheads, or combinations thereof. The polymer build material and the coalescing agent may be as described in further detail herein.

A printhead, in further detail, can be a fluid ejector operable to selectively deposit jettable fluid(s), such as a coalescing agent, coloring agent, or the like, onto the polymer build material to form individually patterned object layers. Fluid ejector(s) can be any type of printing apparatus capable of selectively applying the jettable fluid(s). For example, the printhead can be a fluid ejector or digital fluid ejector, such as an inkjet printhead, e.g., a piezo-electric printhead, a thermal printhead, a continuous printhead, etc. The printhead could likewise be a sprayer, a dropper, or other similar structure for applying the coalescing agent to the polymer build material.

The printhead can be located on a carriage track, but could be supported by any of a number of structures, and may in some examples, be operable to move back and forth over the polymer build material along the carriage track when positioned over or adjacent to a powder bed of a build platform.

The three-dimensional printing system can include a build platform 340 to support the polymer build material. The build platform can be positioned to permit application of the coalescing agent from the printhead onto a layer of the polymer build material. The build platform can be configured to drop in height, thus allowing for successive layers of polymer build material to be applied by a supply and/or spreader 350, which may further be included as part of the system. The polymer build material may be layered in the build platform at a thickness that can range from about 5 μm to about 1 cm. In some examples, individual layers applied in the build platform can have a uniform thickness. A thickness of a layer of the polymer build material can range from about 50 μm to about 1 mm, from about 100 μm to about 500 μm, or from about 500 μm to about 1 mm.

Following the selective application of a coalescing agent to the polymer build material, the polymer build material can be exposed to heat from the radiant heat source. The radiant heat source can be an infrared (IR) or near-infrared light source, such as IR or near-IR curing lamps, IR or near-IR light emitting diodes (LED), or lasers with the desirable IR or near-IR electromagnetic wavelengths, and can emit radiation having a wavelength ranging from about 400 nm to about 1 mm. In some examples, the radiant heat source can be operatively connected to a lamp/laser driver, an input/output temperature controller, and/or temperature sensors.

Polymer Build Materials

The polymer build material can be used as the bulk material of the three-dimensional printed object. As mentioned, the polymer build material can include from about 80 wt % to 100 wt % polymeric particles. In other examples, the polymer build material can include from about 85 wt % to about 95 wt %, from about 90 wt % to 100 wt %, or 100 wt % polymeric particles. In certain examples, the polymeric particles can include polyamide particles. Example polyamide particles that can be used include polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, a copolymer thereof, or an admixture thereof. In other examples, the polymer build material can include polyamides such as polyamide-6, polyamide-12, or an admixture thereof. The polymer build material can include a thermoplastic polyamide elastomer. Other types of polymeric particles that can be used include polyethylene, wax, thermoplastic polyurethane, acrylonitrile butadiene styrene, polymethylmethacrylate, ethylene-vinyl acetate, polyarylate, aromatic polyesters, silicone rubber, polypropylene, polyester, polycarbonate, copolymers of polycarbonate with acrylonitrile butadiene styrene, copolymers of polycarbonate with polyethylene terephthalate, polyether ketone, polyacrylate, polystyrene, polyvinylidene fluoride, poly(vinylidene fluoride-trifluoroethylene), poly(vinylidene fluoride-trifluoroethylene-chlorotrifluoroethylene), mixtures thereof, or the like.

If other types of fillers are used, examples can include inorganic particles such as alumina, silica, fibers, glass fibers, glass beads, carbon nanotubes, or combinations thereof. When the polymeric particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, the filler particles can be included in the polymer build material of the powder bed at about 0.01 wt % to about 20 wt %, from about 0.1 wt % to about 10 wt %, or from about 0.2 wt % to about 5 wt %, for example, based on the total weight of the polymer build material.

The polymer build material may include similarly sized polymeric particles and/or differently sized polymeric particles. The terms "particle size" or "average particle size" as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles can scatter light at smaller angles, while small particles can scatter light at larger angles. The particle analyzer can then analyze the angular scattering data to calculate the size of the particles using the Mie theory of light scattering. Particle size can be reported as a volume equivalent sphere diameter. An "average" particle size can refer to a mathematical average of the particle sizes. The polymeric particles can have an average particle size from about 50 µm to about 1 mm, from about 50 µm to about 500 µm, from about 250 µm to about 500 µm, from about 100 µm to about 800 µm, from about 500 µm to about 1 mm, from about 250 µm to about 750 µm, or from about 750 µm to about 1 mm.

The polymer build material of the powder bed can include the polymeric particles (and in some instances other types of particles blended therewith) having a variety of shapes, such as spherical particles (average aspect ratio of about 1:1) or irregularly-shaped particles (average aspect ratios of about 1:1 to about 1:2). Other average aspect ratios can also be used, e.g., from about 1:1.2 to about 1:5, from about 1:1.5 to about 1:3, etc. If other particles are present, they can have a similar or different aspect ratio relative to the polymeric particles.

The polymer build material can be capable of being formed into three-dimensional printed objects with a resolution of about 20 µm to about 150 µm, about 20 µm to about 100 µm, about 30 µm to about 90 µm, or about 40 µm to about 80 µm. As used herein, "resolution" refers to the size of the smallest feature that can be formed on a three-dimensional printed object. To achieve this resolution, the polymer powder can have an average particle size from about 10 µm to about 150 µm, from about 20 µm to about 100 µm, from about 30 µm to about 90 µm, from about 40 µm to about 80 µm, or from about 20 µm to about 50 µm, for example. With smaller average particle sizes, there can be more flexibility regarding how thick the individual layers may be, for example. For example, in alignment with the resolutions described above, the polymer powder can form layers from about 20 µm to about 150 µm thick, or any of the sub-range resolutions mentioned above. This can provide a resolution in the z-axis direction (e.g., depth or direction of three-dimensional object build-up) of about 20 µm to about 150 µm. Likewise, the polymer particles can also have these sizes so that they are sufficiently small to provide about 20 µm to about 150 µm resolution along the x-axis and y-axis (e.g., the axes parallel to the top surface of the powder bed). The x-axis and y-axis resolution will be noticeable at the edges or ends of the printed object at side surfaces during the build. With this in mind, it is notable that in other examples, thicker layers of polymer can be used when high resolution is not demanded, e.g., individual polymer build material layers can be applied at from about 150 µm to about 300 µm, and larger particles can likewise be used as may be practical. Thus, in more practical terms, a range of polymer powder thickness can be from about 20 µm to about 300 µm and/or an average particle size can be from about 10 µm to about 275 µm, with subranges as set forth above.

The polymeric particles can have a melting temperature from about 70° C. to about 275° C., depending on the specific particles selected for use. In some examples, the polymeric particles can have a melting point from about 125° C. to about 250° C., or from about 150° C. to about 200° C. In other examples, polyamide-12 particles can have a melting temperature within the range of about 125° C. to about 275° C. or from about 170° C. to about 200° C., for example. Thermoplastic polyamide elastomer (TPA) can have a melting temperature from about 120° C. to about 210° C. or from about 130° C. to about 180° C. On the other hand, various polymeric particles described herein can have a softening point that is near or relatively distant in temperature from the melting point, ranging from about 60° C. to about 250° C., depending on a variety of factors. Softening point can be determined, for example, using the Vicat method (ASTM-D1525 or ISO 306).

Coalescing Agents

The method of three-dimensional printing, the three-dimensional printing kit, and the system for three-dimensional printing can implement the use of a coalescing agent, as mentioned. The coalescing agent can include an aqueous liquid vehicle and a coalescing solvent. In some examples, the coalescing agent can include, or can consist essentially of, the coalescing solvent in an aqueous liquid vehicle. The aqueous liquid vehicle can include water, and in some instances, other fluids, such as organic co-solvent (in addition to the coalescing solvent), surfactant, or the like.

The coalescing solvent that can depress a melting point of polymeric particles of a polymer build material can depress the melting point by about 1° C. to about 20° C. resulting in a modified melting point from about 90° C. to about 200° C. The coalescing solvent can depress a melting point of the polymeric particles by about 1° C. to about 10° C., from about 10° C. to about 20° C., or from about 5° C. to about 15° C. The depressing can result in in a modified melting point ranging from 90° C. to about 120° C., from about 150° C. to about 200° C., from about 150° C. to about 200° C., or from about 120° C. to about 180° C. The coalescing agent can be applied with precision to certain areas of a polymer build material that are desired to form a layer of the final three-dimensional printed object. After applying the coalescing agent, the powder bed material can be heated. The coalescing solvent from the coalescing agent can depress a melting point of the polymeric particles so that the polymeric particles in contact with the coalescing solvent can melt at a surface thereof and can fuse together. An appropriate amount of heat can be applied so that the area of the powder bed material that was printed with the coalescing solvent heats to a temperature greater than the depressed melting point to melt a portion of the polymeric particles, while the powder bed material that was not printed with the coalescing agent remains below a melting temperature of a polymer of the polymeric particles and remains as a loose powder with separate distinct polymeric particles.

The coalescing solvent, in further detail, can be selected from 1-(2-hydroxyethyl)-2-pyrrolidone, 1,5-pentanediol, benzyl alcohol, ester alcohols, glycol ethers, esters, dimethylsulfoxide, hexafluoroisopropanol, cresol, diols, 1,2-butanediol, 1-methyl-2,3-propanediol, 2-pyrrolidone, glycerol, 2-phyenoxyethanol, 2-phenylethanol, 3-phenylpropanol or a combination thereof. The coalescing solvent can be selected from 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, or a combination thereof. In some examples, the coalescing solvent can include diols, cresols, ester alcohols, glycol ethers, esters, or a combination thereof. In other examples, the coalescing solvent can include 1-(2-hydroxyethyl)-2-pyrrolidone, 1,5-pentanediol, benzyl alcohol, dimethylsulfoxide, hexafluoroisopropanol, 1,2-butanediol, 1-methyl-2,3-propanediol, 2-pyrrolidone, glycerol, 2-phyenoxyethanol, 2-phenylethanol, 3-phenylpropanol or a combination thereof. The coalescing solvent can include 1-(2-hydroxyethyl)-2-pyrrolidone, 1,5-pentanediol, benzyl alcohol, or a combination thereof. In other examples, the coalescing solvent can include 1-(2-hydroxyethyl)-2-pyrrolidone, benzyl alcohol, or a combination thereof. The coalescing solvent can include 1,5-pentanediol, benzyl alcohol, or a combination thereof. The coalescing solvent can include benzyl alcohol.

The amount of coalescing solvent in the coalescing agent can vary. For example, the concentration of coalescing solvent in the coalescing agent can range from about 30 wt % to about 70 wt %. In other examples, an amount of the coalescing solvent in the coalescing agent can range from about 30 wt % to about 60 wt %, from about 40 wt % to about 70 wt %, from about 50 wt % to about 70 wt %, or from about 40 wt % to about 60 wt %.

Aqueous Liquid Vehicles

As used herein, the term "aqueous liquid vehicle" may refer to the liquid in the coalescing agent and/or other fluid agents or dispersed particles that may be present, e.g., water, other organic co-solvent(s), surfactant, latex polymer, colorant, e.g., pigment and/or solvent, etc. The aqueous liquid vehicle may include water alone or may include water in combination with a variety of additional components. In further detail, examples of components that may also be present, in addition to water, may include organic co-solvent, surfactant, buffer, antimicrobial agent, anti-kogation agent, chelating agent, buffer, colorant, latex polymer, etc. For example, the aqueous liquid vehicle may be water and an organic co-solvent, other than the coalescing solvent. In other examples, the aqueous liquid vehicle can include water, organic co-solvent, and a surfactant. The aqueous liquid vehicle can include water, organic co-solvent, surfactant, and antimicrobial agent. The aqueous liquid vehicle can include water, organic co-solvent, surfactant, antimicrobial agent, and a chelating agent. Other combinations of components can also be prepared in formulating the coalescing agent.

The aqueous liquid vehicle can include water that may be deionized, for example. In some examples, water can be present in the fluid agent at a weight percentage that can vary from about 20 wt % to about 70 wt %, from about 20 wt % to about 60 wt %, from about 50 wt % to about 70 wt %, or from about 30 wt % to about 60 wt %.

Organic co-solvent(s), other than the coalescing solvent(s) that may be present, can include ethanol, methanol, propanol, acetone, tetrahydrofuran, hexane, 1-butanol, 2-butanol, tert-butanol, isopropanol, propylene glycol, triethylene glycol, methyl ethyl ketone, dimethylformamide, 1,4-dioxone, acetonitrile, or a combination thereof. Whether a single organic co-solvent is included or a combination of organic co-solvents are included, a total amount of organic co-solvent(s) (other than the coalescing solvent), if present, can range from about 0.01 wt % to about 30 wt %, from about 1 wt % to about 30 wt %, from about 5 wt % to about 30 wt %, from about 5 wt % to about 25 wt %, or from about 1 wt % to about 10 wt %, based on a total weight percentage of the coalescing agent. Again, this weight percentage excludes the content of the coalescing solvent.

The aqueous liquid vehicle may also include surfactant. The surfactant can include a non-ionic surfactant, a cationic surfactant, and/or an anionic surfactant. In some examples, the fluid agent can include an anionic surfactant. In other examples, the fluid agent can include a non-ionic surfactant. The fluid agent can include a blend of both anionic and non-ionic surfactant. Example non-ionic surfactant that can be used include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Other surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), and oleth-3 phosphate surfactant (e.g., CRODAFOS™ N3 Acid and CRODAFOS™ O3A both from Croda, UK). Example cationic surfactant that can be used can include dodecyltrimethylammonium chloride, hexadecyldimethylammonium chloride, or a combination thereof. The surfactant (which may be a blend of multiple surfactants) may be present in the coalescing agent, or other fluid agent at an amount ranging from about 0.01 wt % to about 2 wt %, from about 0.05 wt % to about 1.5 wt %, or from about 0.01 wt % to about 1 wt %.

The aqueous liquid vehicle may also include antimicrobial agents. Antimicrobial agents can include biocides and fungicides. Example antimicrobial agents can include the NUOSEPT® (Ashland Inc., USA), VANCIDE® (R. T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In some examples, if included, a total amount of antimicrobial agents in the coalescing agent or other fluid agent can range from about 0.01 wt % to about 1 wt %.

An aqueous liquid vehicle may include buffer solution(s) that can withstand small changes (e.g., less than 1) in pH when small quantities of a water-soluble acid or a water-soluble base are added to a composition containing the buffer solution(s). The buffer solution(s) can have pH ranges from about 5 to about 9.5, from about 7 to about 9, or from about 7.5 to about 8.5. The buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added to the coalescing agent or other fluid agent at an amount ranging from about 0.01 wt % to about 10 wt %, from about 0.1 wt % to about 7.5 wt %, or from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10% or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "applying" when referring to fluid agent, such as a coalescing agent that may be used, for example, refers to any technology that can be used to put or place the fluid, e.g., coalescing agent, on the polymeric build material or into a layer of polymer build material for forming a three-dimensional object. For example, "applying" may refer to a variety of dispensing technologies, including "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though an individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative three-dimensional methods, kits, and/or systems may be devised without departing from the present disclosure. The appended claims are intended to cover such modifications and arrangements.

Example 1—Preparation of Coalescing Agents

Two coalescing agent formulations were prepared by admixing the respective components as shown in Table 1 below.

TABLE 1

Coalescing Agent Formulations

| | | Formulation ID | |
| --- | --- | --- | --- |
| | | A | B |
| Component | Type | (wt %) | (wt %) |
| 1-(2-hydroxyethyl)-2-pyrrolidone | Coalescing Solvent | 50 | — |
| 1,5-pentanediol | Coalescing Solvent | — | 35 |
| benzyl alcohol | Coalescing Solvent | 16 | 12 |
| TERGITOL ® 15-S-9 | Surfactant | 0.8 | 0.8 |
| Deionized Water | Solvent | Balance | Balance |

TERGITOL ® 15-S-9 is available from The Dow Chemical Company, USA).

The above formulations were initially tested for jettability by individually dispensing the formulations as bars printed onto a paper medium using an HP® ink jet printer. The coalescing agent formulations did not exhibit any negative effects on decap or nozzle health of the print head.

Example 2—Preparation of Three-Dimensional Objects

In order to test the fusing capability of the coalescing agent formulations from Table 1 above, three three-dimensional objects in the shape of rectangles a few centimeters wide were prepared. The polymeric particles of the polymer build material were polyamide particles, and more specifically 100 wt % polyamide-12 particles. The three-dimensional objects formed had varying thicknesses. The powder was held at an elevated temperature of about 30° C. during printing. The coalescing agents from Table 1 were printed with 4 passes, 5 passes, and 7 passes at a 17 gsm per pass onto the polyamide-12 powder. The polymer build material with coalescing agent printed thereon was placed under a heat source for a thirty second heat cycle at about 170° C. All of the three-dimensional printed objects fused following exposure to heat and were capable of being moved from the powder bed as a polymeric particle-fused three-dimensional object. High selectivity was observed. Areas of the polymer build material which were not printed with the coalescing agent did not become fused.

Example 3—Durability Testing of Three-Dimensional Objects

The polymer particle-fused three-dimensional objects were first viewed under a microscope to observe visible indications of fusing. Structural adhesion between individual particles was observed. The structural adhesion appeared to include the surface of the polyamide-12 particles melting and sticking to one another, leaving some space or voids between the surface-fused particles.

The three-dimensional printed objects were then subjected to a variety of durability tests. The durability tests included attempted tearing with fingers, pressure application by squeezing the objects between fingers, and 20 psi bead blasting. The three-dimensional object formed with 4 passes was stable, but was also relatively easy to tear apart. The other two three-dimensional objects did not tear. All of the three-dimensional objects were capable of being squeezed between fingers without any visible deformation. Furthermore, the polymer particle-fused three-dimensional object formed with 7 printing passes even survived the 20 psi bead blasting.

The examples above indicate that a coalescing solvent can be used to fuse polyamide particles to one another without the need for a conventional fusing agent including a radiation absorber. The coalescing solvent can permit the formation of porous polymeric three-dimensional objects which would not be porous if the object was formed using a conventional fusing agent and radiation absorber. The three-dimensional printing process can enable the formation of complex polymeric filters.

What is claimed is:

1. A method of three-dimensional printing, the method comprising:
    iteratively applying a polymer build material as individual layers to a powder bed, wherein the polymer build material includes from about 80 wt % to 100 wt % of polymeric particles;
    based on a three-dimensional object model, selectively applying a coalescing agent onto individual layers of the polymer build material, the coalescing agent including an aqueous liquid vehicle and a coalescing solvent to depress a melting point of the polymeric particles, wherein the coalescing agent is free of a radiation absorber; and
    exposing the powder bed to heat to selectively coalesce portions of individual layers of the polymer build material in contact with the coalescing solvent, wherein the heat is not sufficient to coalesce the polymer build material not in contact with the coalescing solvent, and wherein the polymeric particles in contact with the coalescing solvent fuse together to form a three-dimensional object.

2. The method of three-dimensional printing of claim 1, wherein the coalescing solvent depresses a melting point of the polymeric particles by about 1° C. to about 20° C. resulting in a modified melting point from about 90° C. to about 200° C.

3. The method of three-dimensional printing of claim 1, wherein the coalescing agent is applied to the polymer build material at a weight ratio of coalescing solvent to polymer particles of about 1:3 to about 20:1.

4. The method of three-dimensional printing of claim 1, wherein the heat is radiant heat applied for a heating time period that ranges from about 5 minutes to about 45 minutes and brings the powder bed to a temperature ranging from about 80° C. to about 160° C.

5. The method of three-dimensional printing of claim 1, wherein the three-dimensional object is a porous filter having a porosity ranging from about 20% to about 90% by volume.

6. The method of three-dimensional printing of claim 1, wherein the polymer build material includes polyamide-6, polyamide-8, polyamide-9, polyamide-11, polyamide-12, polyamide-6,6, polyamide-6, 12, polyamide-8,12, polyamide, thermoplastic polyamide, polymer blends thereof, amorphous polymers thereof, core-shell polymers thereof, or copolymers thereof, and wherein the polymeric particles have an average particle size of from about 50 μm to about 1 mm.

7. The method of three-dimensional printing of claim 1, wherein the coalescing solvent is selected from the group consisting of 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, and a combination thereof.

8. A three-dimensional printing kit, comprising:
    a polymer build material including from about 80 wt % to 100 wt % of polymeric particles; and
    a coalescing agent including an aqueous liquid vehicle and a coalescing solvent that depresses a melting point of the polymeric particles when contacted therewith, wherein the coalescing agent is free of a radiation absorber,
    wherein the three-dimensional printing kit excludes a fusing agent containing a radiation absorber.

9. The three-dimensional printing kit of claim 8, wherein the polymer build material includes polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, or copolymers thereof, and wherein the polymeric particles have an average particle size of from about 50 μm to about 1 mm.

10. The three-dimensional printing kit of claim 8, wherein the coalescing solvent is selected from the group consisting of 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, and a combination thereof.

11. The three-dimensional printing kit of claim 8, wherein the coalescing solvent is present in the coalescing agent in an amount of from about 30 wt % to about 70 wt %.

12. The three-dimensional printing kit of claim 8, wherein the coalescing solvent depresses a melting point of the polymeric particles by about 1° C. to about 20° C. resulting in a modified melting point from about 90° C. to about 200° C.

13. A system for three-dimensional printing, the system comprising:
  a polymer build material including from about 80 wt % to 100 wt % of polymeric particles;
  a coalescing agent including an aqueous liquid vehicle and a coalescing solvent operable to depress a melting point of the polymeric particles, wherein the coalescing agent is free of a radiation absorber;
  a printhead fluidly coupled to or fluidly coupleable to the coalescing agent to selectively and iteratively eject the coalescing agent onto successive placed individual layers of the polymer build material, wherein the coalescing agent depresses a melting point of the polymeric particles; and
  a radiant heat source positioned or positionable to expose the individual layers of the polymer build material to radiation energy to selectively fuse the polymeric particles in contact with the coalescing solvent to iteratively form a three-dimensional object,
  wherein the system excludes a fusing agent containing a radiation absorber.

14. The system for three-dimensional printing of claim 13, wherein the polymeric particles include polyamide-6, polyamide-8, polyamide-9, polyamide-11, polyamide-12, polyamide-6,6, polyamide-6,12, polyamide-8,12, polyamide, thermoplastic polyamide, polymer blends thereof, amorphous polymers thereof, core-shell polymers thereof, or a copolymer thereof.

15. The system for three-dimensional printing of claim 13, wherein the system is operable to form a three-dimensional porous object having a porosity ranging from about 20% to about 90% by volume.

16. The system for three-dimensional printing of claim 13, wherein the coalescing solvent is selected from the group consisting of 1-(2-hydroxyethyl)-2-pyrrolidone, 1,5-pentanediol, benzyl alcohol, ester alcohol, glycol ether, an ester, dimethylsulfoxide, hexafluoroisopropanol, cresols, diols, 1,2-butanediol, 1-methyl-2,3-propanediol, 2-pyrrolidone, glycerol, 2-phyenoxyethanol, 2-phenylethanol, 3-phenylpropanol, and a combination thereof.

* * * * *